United States Patent
Choi et al.

(10) Patent No.: US 7,134,590 B2
(45) Date of Patent: Nov. 14, 2006

(54) DESOLDERING SHEATH

(76) Inventors: Moon Gul Choi, 4137 Ambrosia La., Plano, TX (US) 75093; Criswell Hyunsoo Choi, 1042 Fernleaf Dr., Sunnyvale, CA (US) 94086

(*) Notice: Subject to any disclaimer, the term of this patent is extended or adjusted under 35 U.S.C. 154(b) by 42 days.

(21) Appl. No.: 10/802,065

(22) Filed: Mar. 16, 2004

(65) Prior Publication Data

US 2005/0205643 A1    Sep. 22, 2005

(51) Int. Cl.
*B23K 1/00* (2006.01)
*B23K 5/22* (2006.01)

(52) U.S. Cl. ........................................ 228/19
(58) Field of Classification Search ............. 228/19, 228/20.5, 21, 51, 52, 55, 119
See application file for complete search history.

(56) References Cited

U.S. PATENT DOCUMENTS

| | | | | |
|---|---|---|---|---|
| 3,172,382 A | * | 3/1965 | Weglin | 228/20.5 |
| 3,263,889 A | * | 8/1966 | Fortune | 228/20.5 |
| 3,580,462 A | * | 5/1971 | Vanyi | 228/51 |
| 3,627,191 A | * | 12/1971 | Hood, Jr. | 228/19 |
| 3,881,087 A | * | 4/1975 | Nicosia | 219/233 |
| 4,137,369 A | * | 1/1979 | Chaikin | 428/624 |
| 4,323,631 A | * | 4/1982 | Spirig | 428/605 |
| RE32,086 E | * | 2/1986 | Spirig | 228/19 |
| 5,072,874 A | * | 12/1991 | Bertram et al. | 228/264 |
| 5,083,698 A | * | 1/1992 | Forsha | 228/160 |
| 5,305,941 A | * | 4/1994 | Kent et al. | 228/19 |
| 2002/0153404 A1 | * | 10/2002 | Kaneko | 228/14 |

* cited by examiner

*Primary Examiner*—Lynne R. Edmondson
(74) *Attorney, Agent, or Firm*—Colin P. Cahoon; Christopher P. O'Hagan; Carstens & Cahoon, LLP

(57) ABSTRACT

A desoldering sheath that comprises at least one hollow metal wire molded to conform to the tip of a desoldering tool. In one implementation, the desoldering sheath is formed using a hollow metal wire that is coiled around a male cone-shaped mold. The coiled, hollow metal wire is then compressed between the male cone-shaped mold and a female cone-shaped mold to cause the hollow wire to retain the coiled shape. In use, the desoldering sheath is placed on the tip of a desoldering gun or iron and then heated. The heated desoldering sheath, while still on the tip of the desoldering gun or iron, is then placed into contact with solder. This causes the solder to melt and the desoldering sheath captures the molten solder by using capillary action to draw the molten solder into the hollow metal wire.

10 Claims, 17 Drawing Sheets

FIG._1

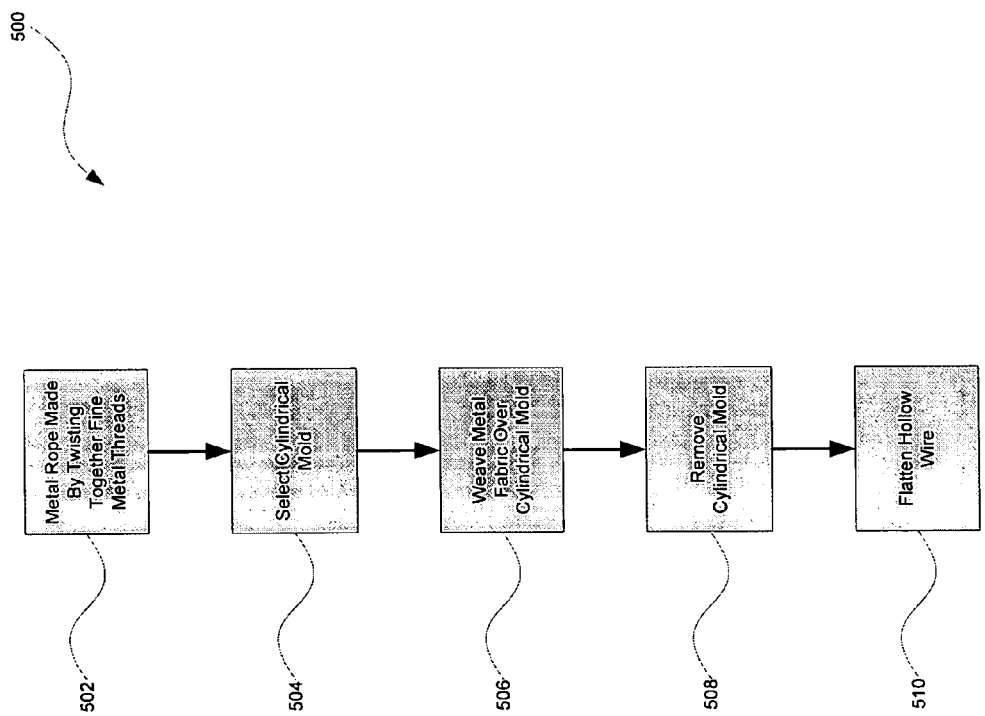
FIG._5A

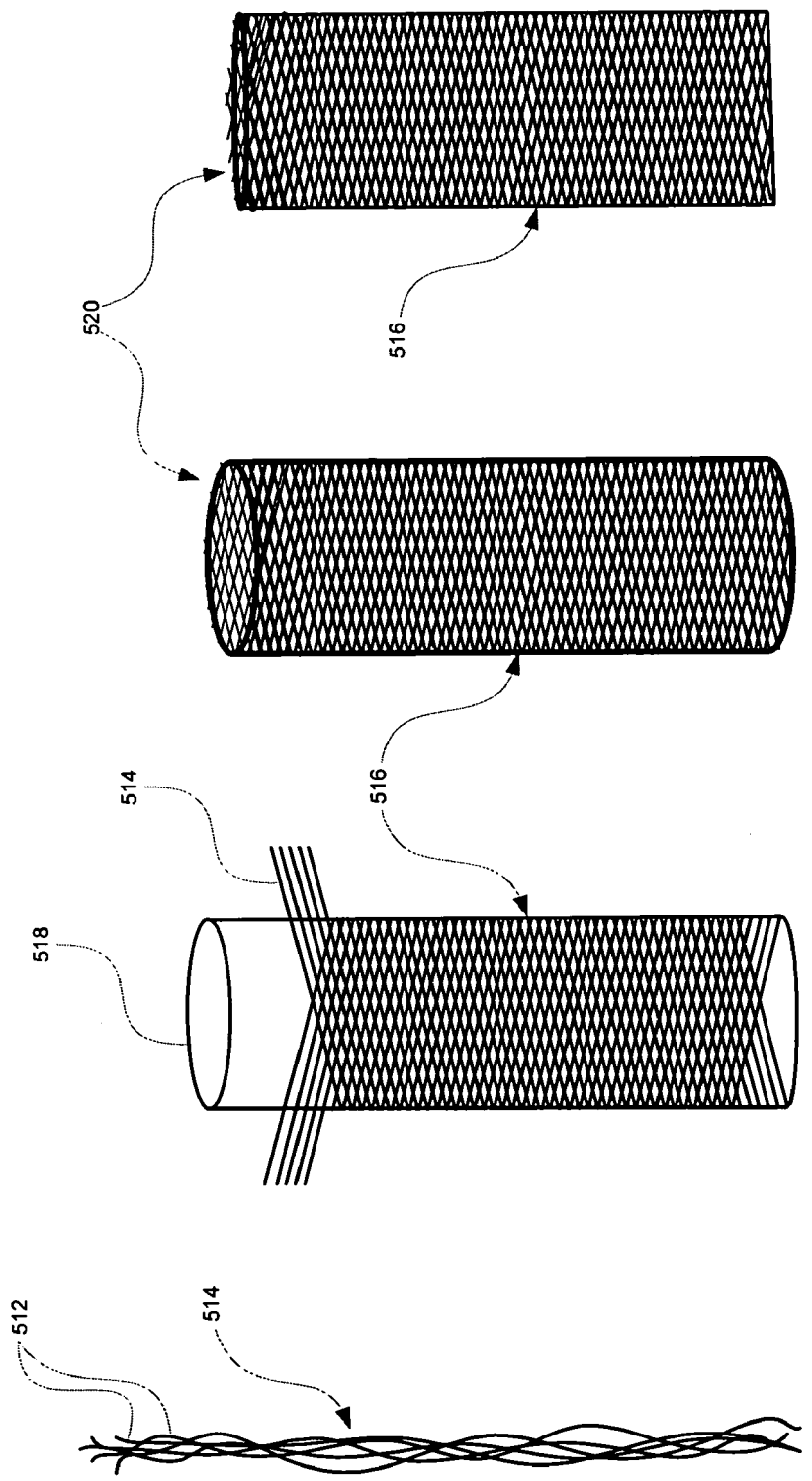

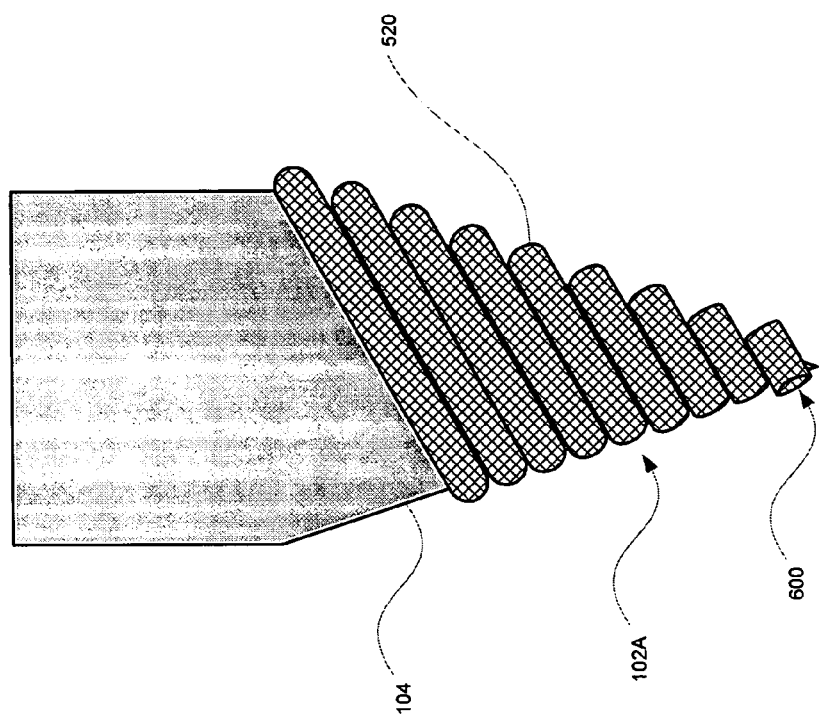
FIG._6

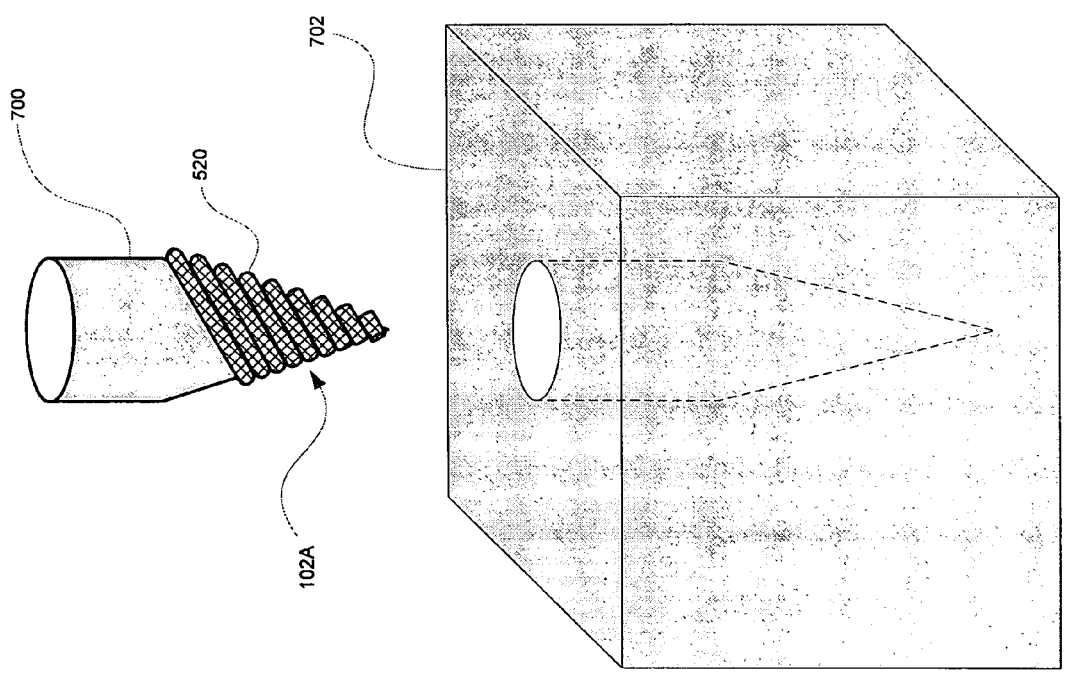
FIG._7

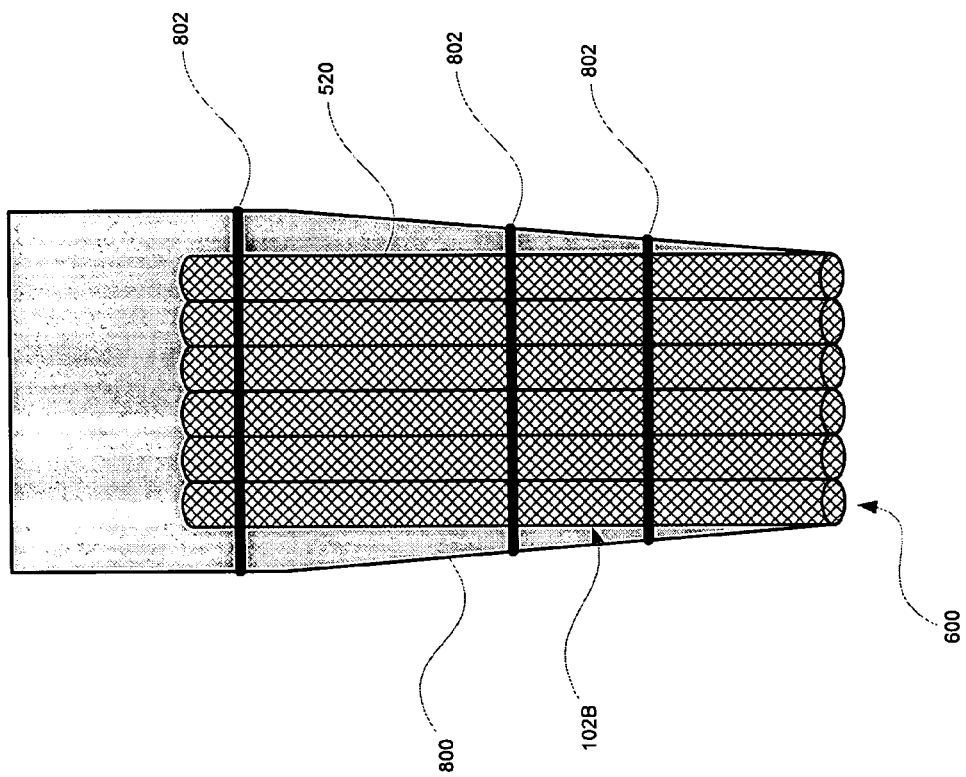
FIG._8

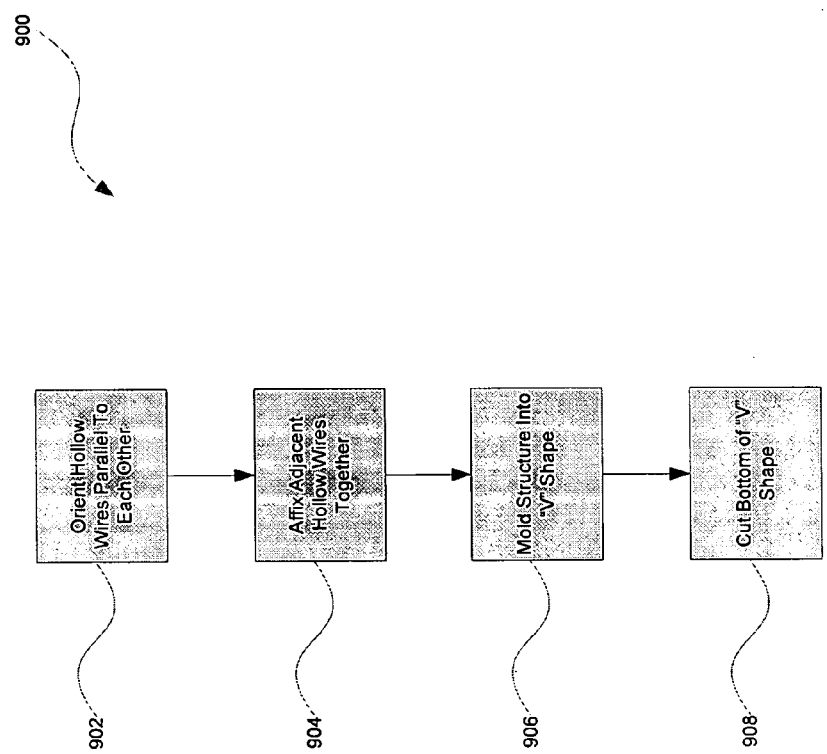
FIG._9A

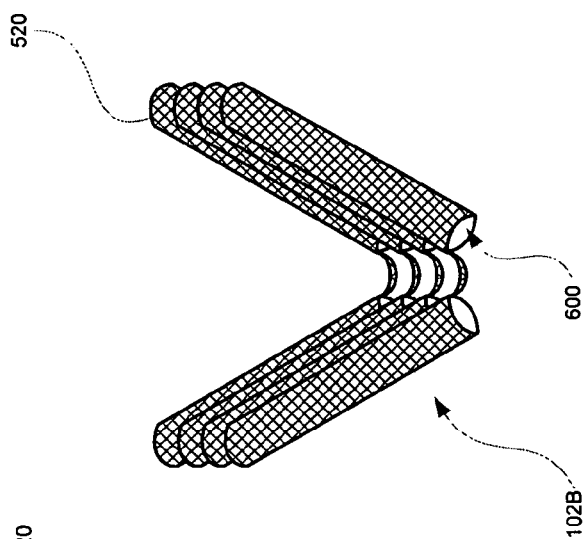
FIG._9D
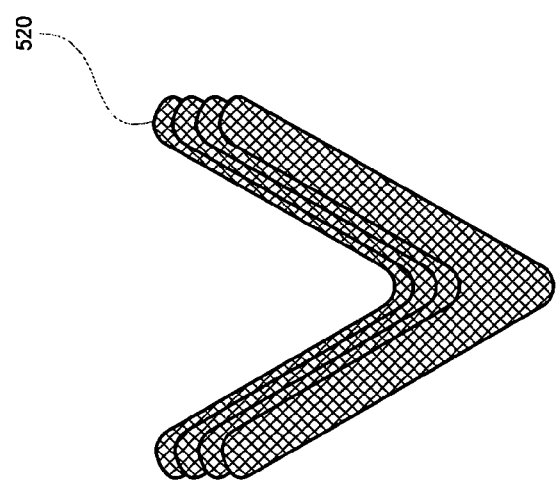
FIG._9C
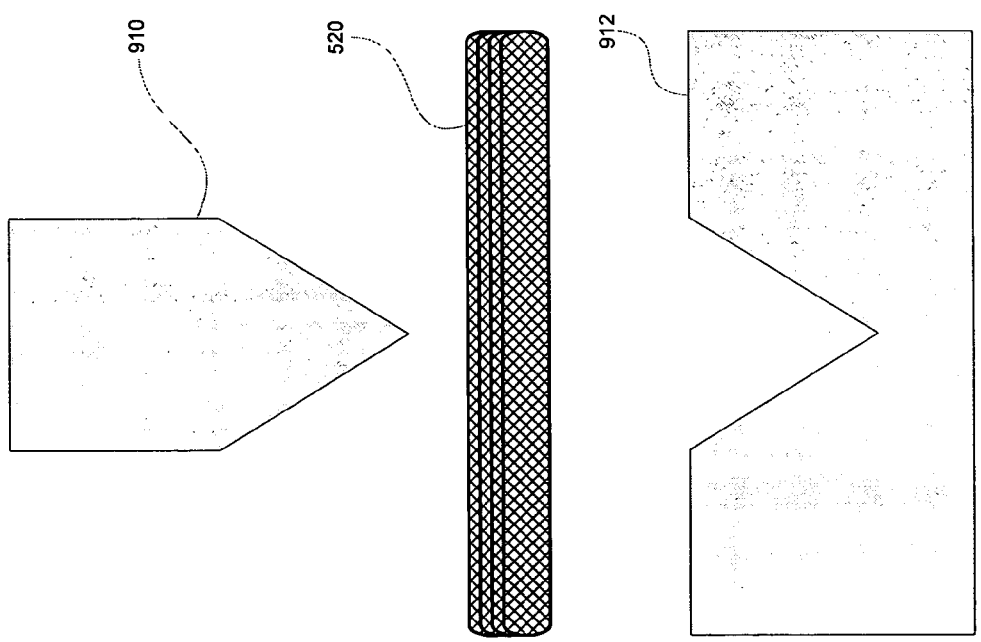
FIG._9B

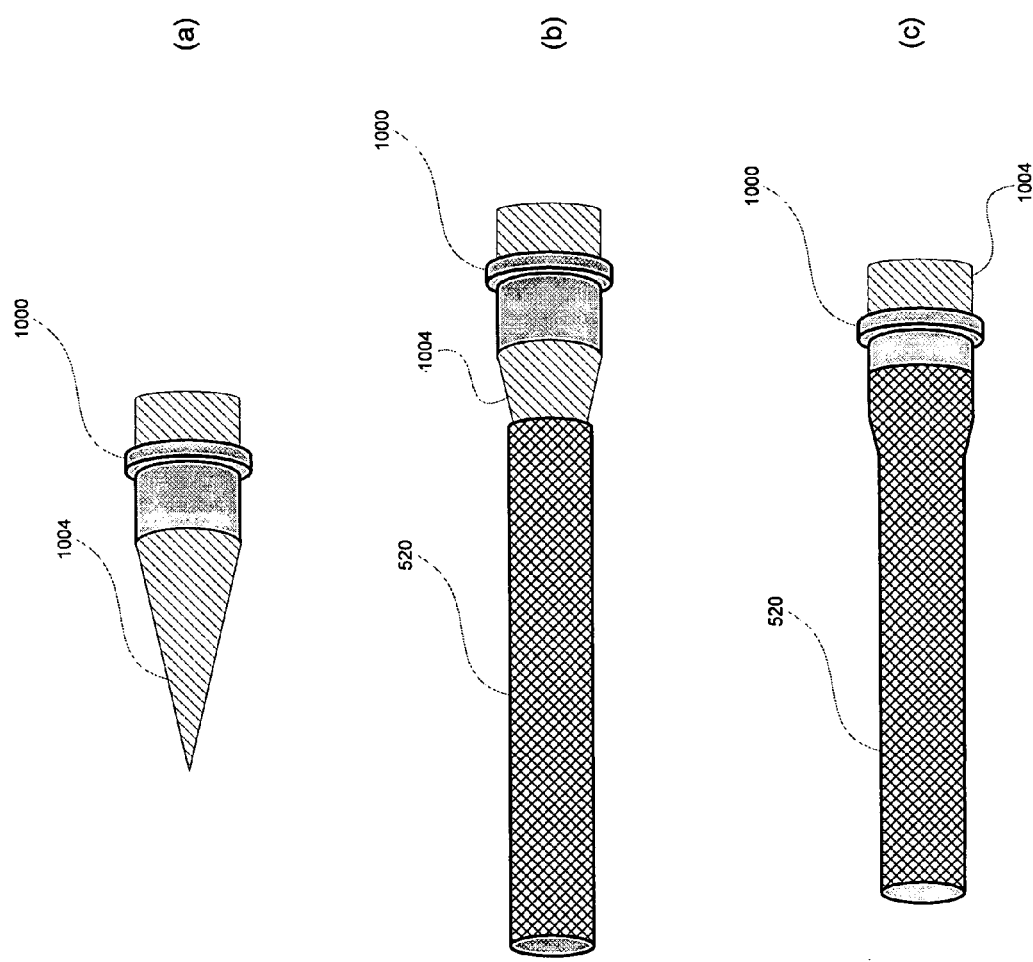
FIG._10B

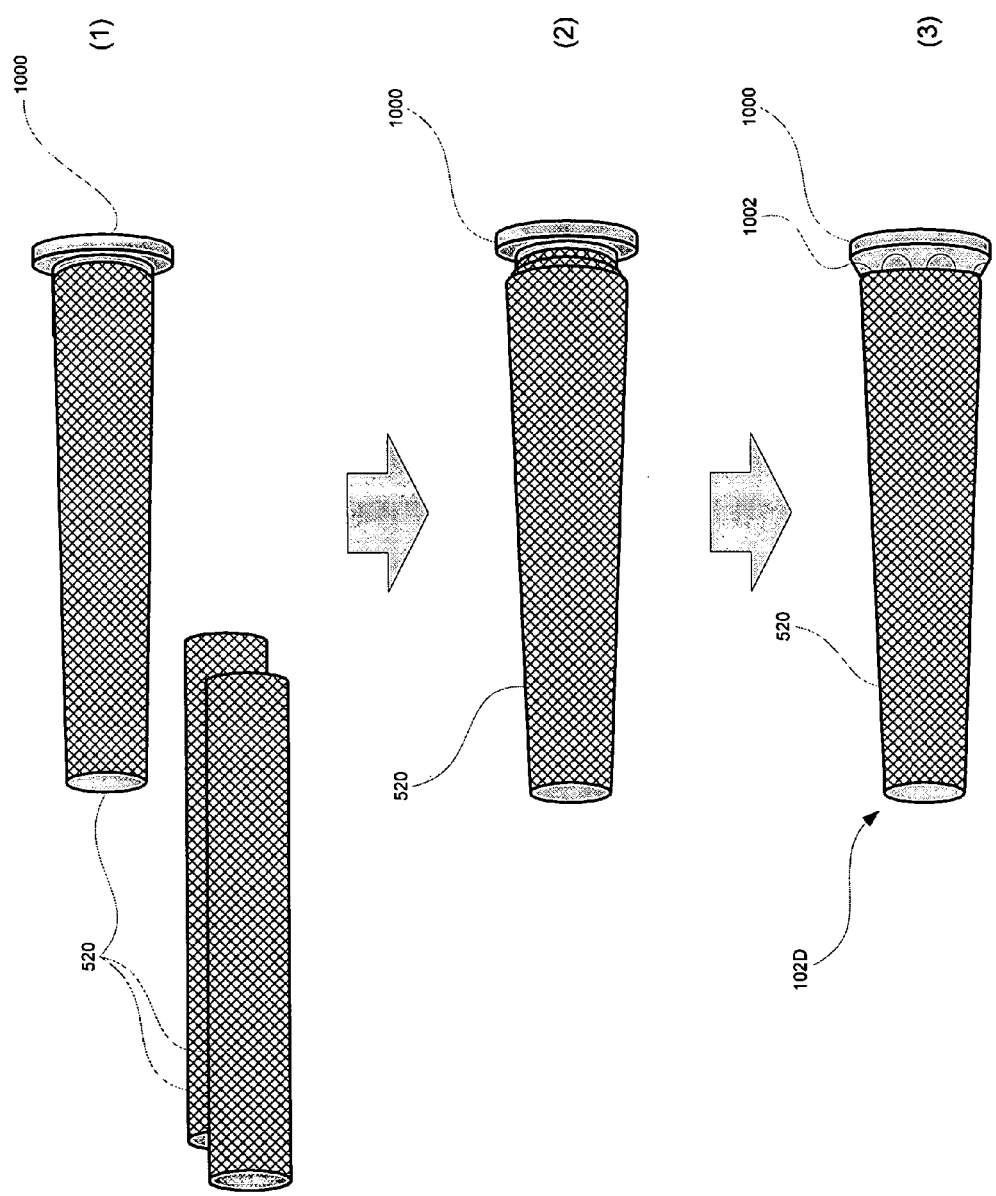
FIG._10C

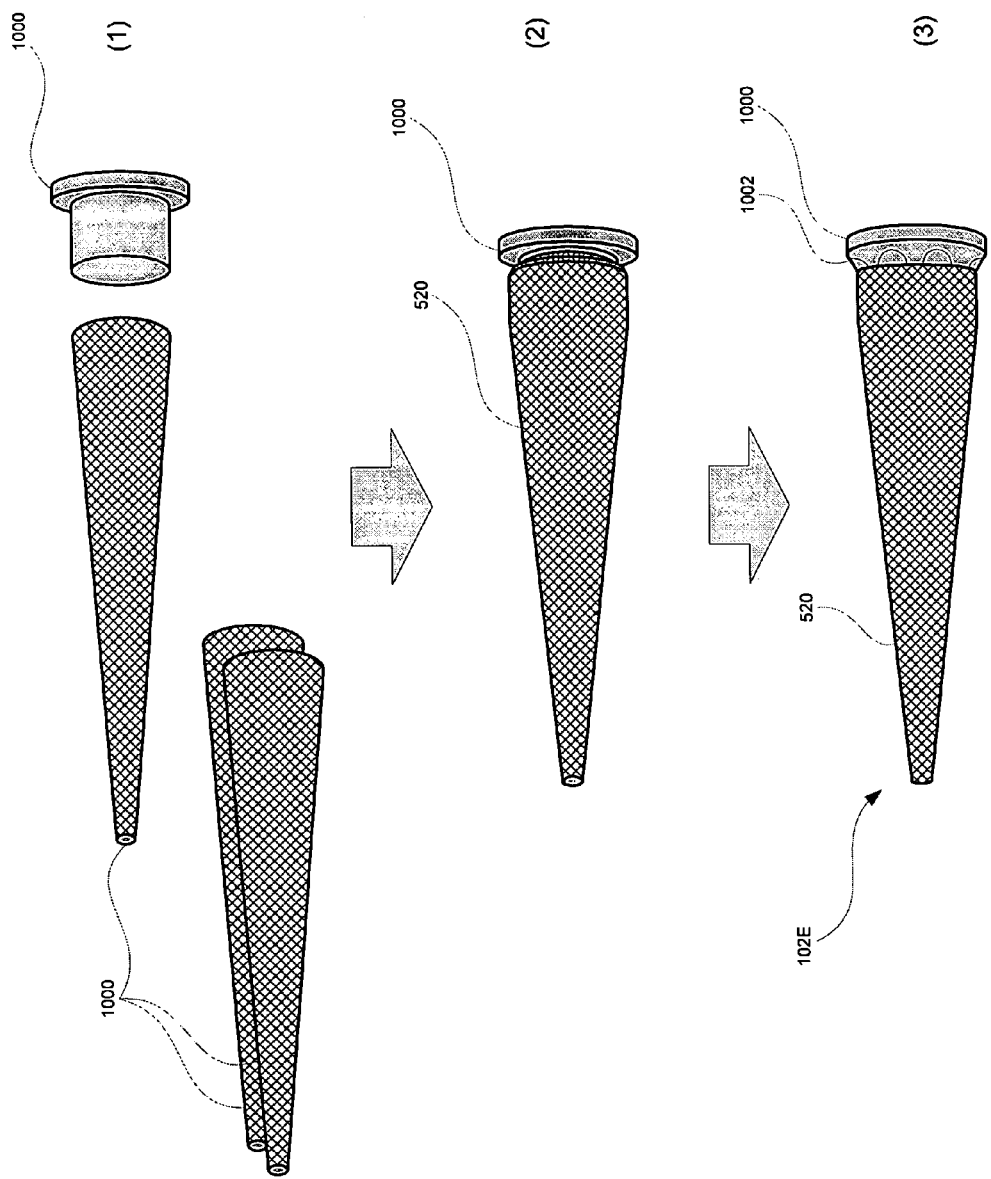
FIG._10D

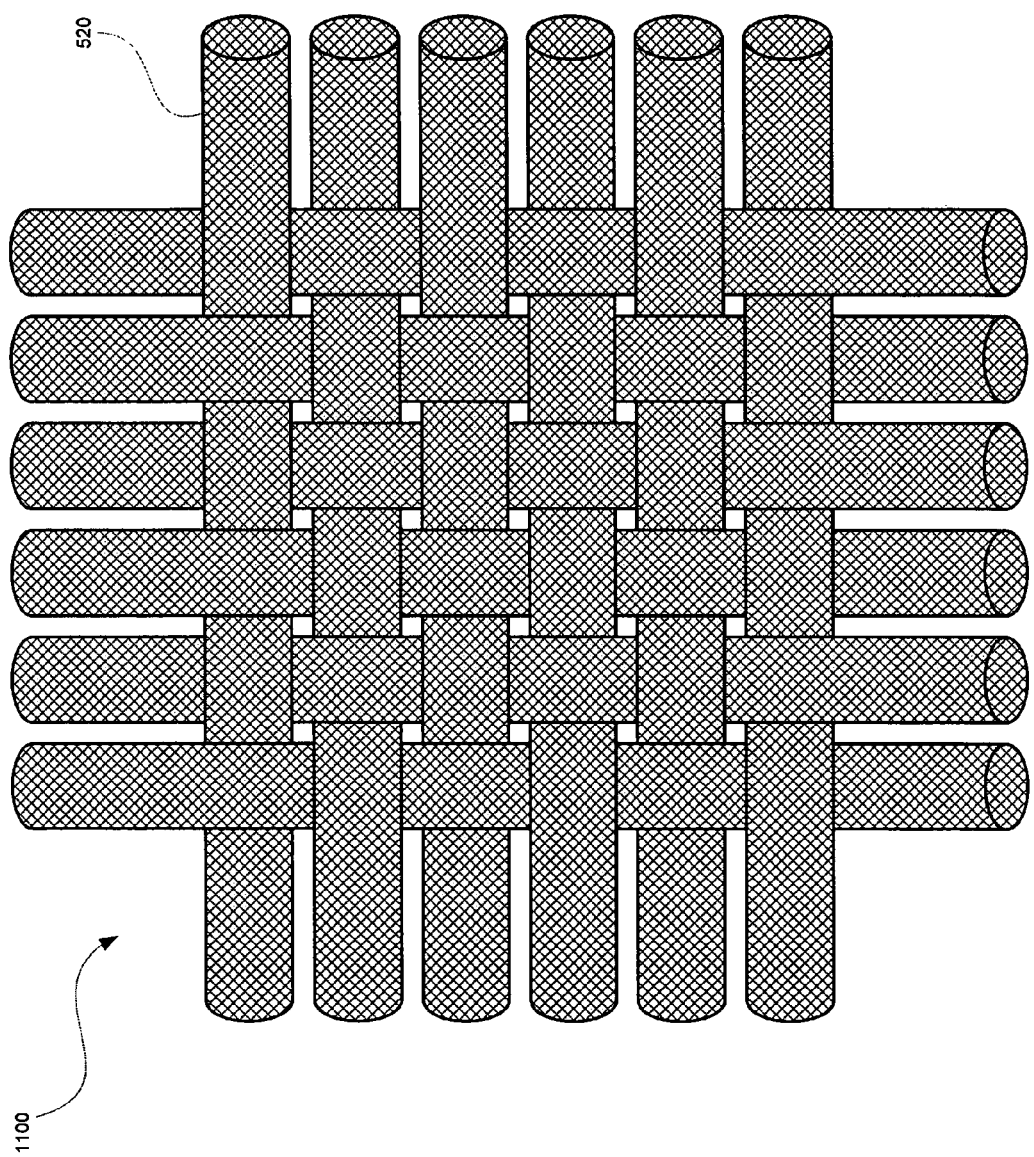
FIG._11

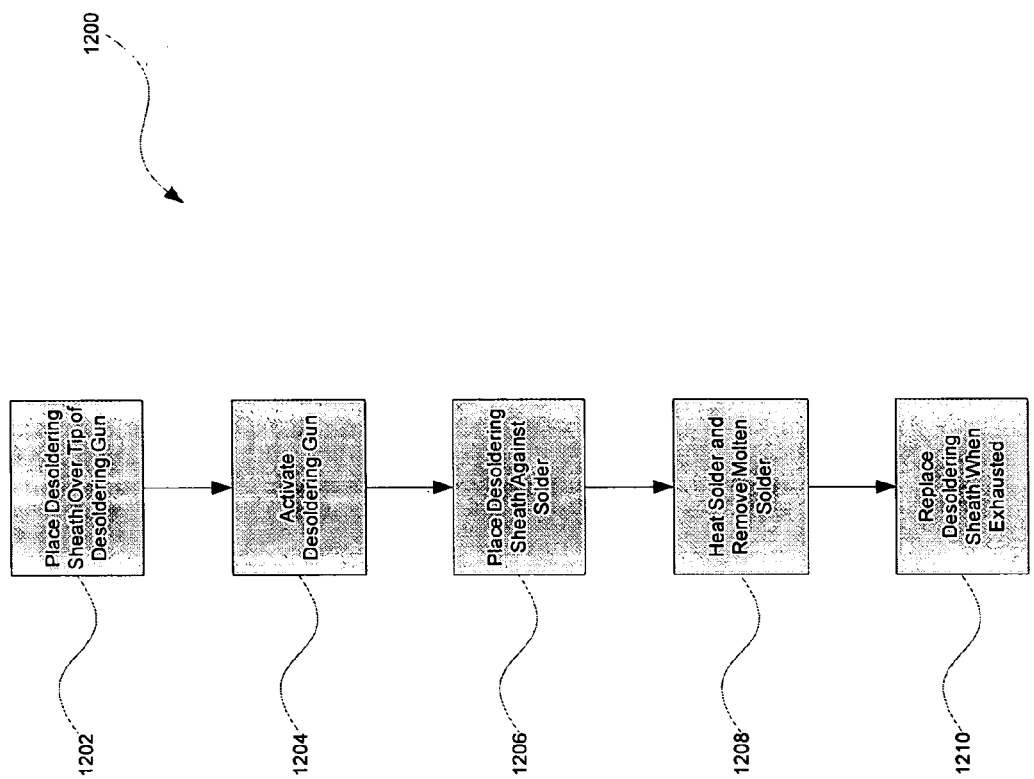

DESOLDERING SHEATH

FIELD OF THE INVENTION

The invention relates to desoldering equipment, namely a desoldering sheath for use with a desoldering gun or iron.

BACKGROUND OF THE INVENTION

Desoldering is a process for removing solder from a printed circuit board (PCB). Known methods for desoldering require two pieces of equipment, a desoldering gun (or a desoldering iron) and a device to remove the solder affixed to the PCB. The desoldering gun serves as a heat source for the desoldering operation. The desoldering gun includes a metal tip that is used to transfer heat to both the solder and the device used to remove the solder. The tip of the desoldering gun generally has either a tapered shape (i.e., conical or pointed) or a square shape.

Conventional devices to remove solder include vacuum pumps and solder wicks. A vacuum pump, also known as a solder sucker, is a suction device resembling a large syringe. The vacuum pump includes a spring loaded plunger to create suction. The plunger starts in a pushed down position, and a button is used to release the plunger whenever suction is required. As the plunger rises, a vacuum is created at a nozzle of the pump to draw molten solder into the vacuum pump, thereby removing the solder from the PCB. A user holds the desoldering gun in one hand and places its tip against the solder to melt it, and the user holds the vacuum pump in their other hand to collect the melted solder.

A solder wick is a braid of metal, generally copper, used to collect molten solder almost like a sponge. The solder wick has no moving parts and is generally positioned between the desoldering gun and the solder when used. The heat from the desoldering gun is then transferred to the solder through the solder wick. For example, a user holds the desoldering gun in one hand and the solder wick in the other hand. The user places the solder wick against the solder and heats the solder wick using the tip of the desoldering gun. The heat is transferred to the solder through the solder wick, and as the solder melts, it is collected by the solder wick.

The use of these conventional methods for removing solder has its drawbacks. One important drawback is that both the vacuum pump method and the solder wick method are two-handed operations. The user must hold the desoldering gun in one hand while working the vacuum pump or the solder wick with the other hand. This presents problems for some users who have a difficult time holding the vacuum pump or solder wick in intimate contact with the solder as the solder is being heated by the desoldering gun. In this situation, if the user moves the desoldering gun away from the solder too soon, the solder may quickly re-solidify and the tip of the vacuum pump or the solder wick may become affixed to the solder. Another drawback of the vacuum pump is that the solder will harden within the vacuum pump after it has been removed from the PCB. It then becomes a tedious task to remove the hardened solder from the vacuum pump. Accordingly, an improved device for removing solder from a PCB is needed.

SUMMARY OF THE INVENTION

The invention is a desoldering sheath that is configured to fit over the tip of a desoldering gun. Having the desoldering sheath mounted directly atop the tip of the desoldering gun enables one-handed desoldering operations with efficient solder removal. The desoldering sheath is formed using one or more hollow metal wires molded into a shape that conforms to the tip of the desoldering gun, for example a cone-shaped tip or an edge-shaped tip. During a desoldering operation, the desoldering sheath is placed over the tip of the desoldering gun and heated. The heated desoldering sheath, still mounted on the desoldering gun, is then placed into contact with the solder being removed. As the solder melts, it is drawn into the hollow metal wires from which the desoldering sheath is formed.

DESCRIPTION OF THE DRAWINGS

FIG. 5A is a method for constructing a hollow metal wire.

FIGS. 5B to 5E graphically describe the steps of the method of FIG. 5A.

FIG. 6 illustrates a cone-shaped desoldering sheath.

FIG. 7 illustrates a cone-shaped desoldering sheath being pressed into a mold.

FIG. 8 illustrates an edge-shaped desoldering sheath.

FIG. 9A is a method for constructing an edge-shaped desoldering sheath.

FIGS. 9B to 9D graphically describe the steps of the method of FIG. 9A.

FIG. 10B illustrates a method for coupling a desoldering sheath to a grommet.

FIG. 10C illustrates a plurality of desoldering sheaths coupled to a grommet.

FIG. 10D illustrates cone-shaped desoldering sheaths on a grommet.

FIG. 11 is a metal fabric formed from hollow metal wires.

FIG. 12 is a method of use for a desoldering sheath.

DETAILED DESCRIPTION

The invention is a desoldering sheath that can be used in conjunction with a desoldering gun (or a desoldering iron) to remove solder from a printed circuit board. The desoldering sheath is configured to be placed directly over the tip of the desoldering gun, covering the tip substantially in its entirety. This enables a user to perform one-handed desoldering operations.

Figure 1:
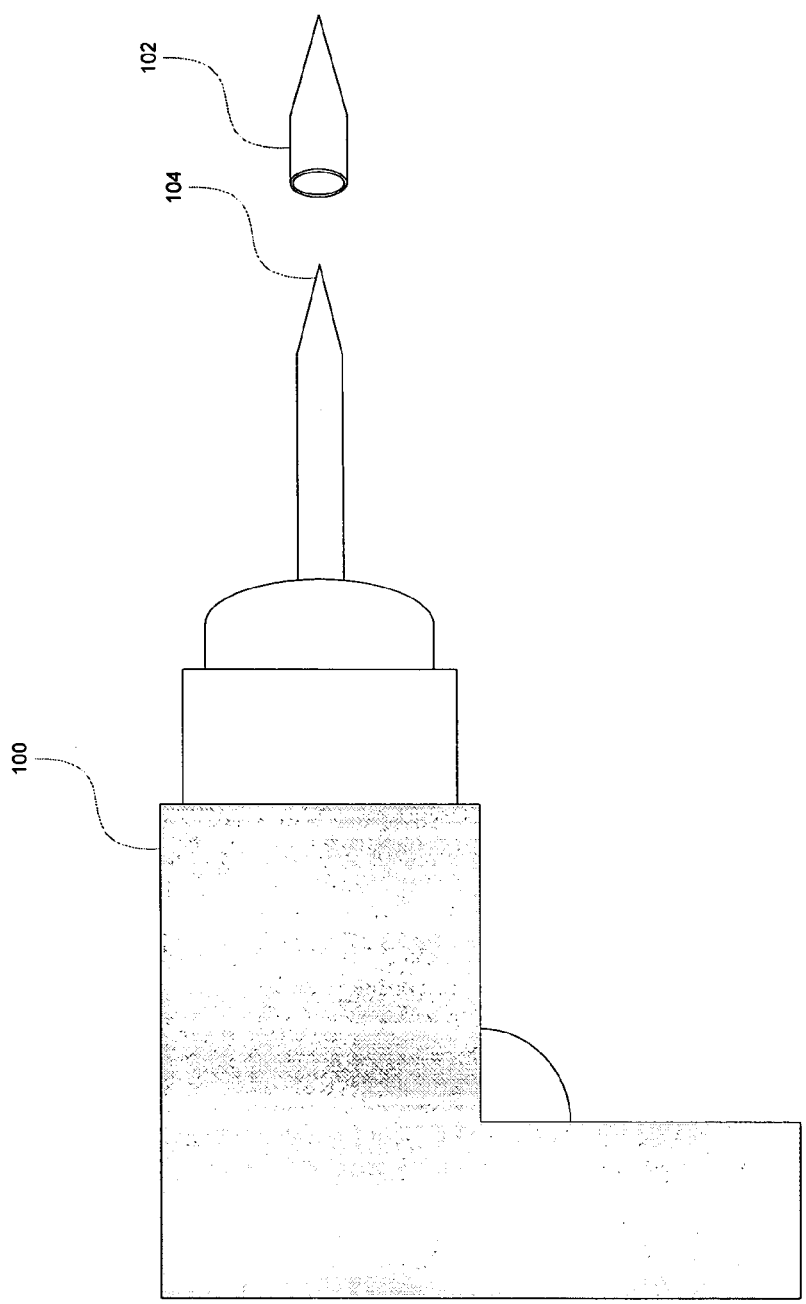
FIG. 1 depicts a desoldering gun and a desoldering sheath.

FIG. 1 illustrates a desoldering gun 100 and one implementation of a desoldering sheath 102 according to the invention. The desoldering gun 100 includes a cone-shaped tip 104 through which heat can be transmitted. During a conventional desoldering operation, the tip 104 is heated and placed into contact with solid solder that needs to be removed. The heat from the tip 104 is transmitted to the solder causing it to melt. The molten solder is then captured using a solder wick (also known as a desoldering braid). The solder wick is placed into contact with the melted solder, and is often placed in between the tip 104 and the solder. This allows the heat from the tip 104 to be transferred through the solder wick to the solder, and prevents the solder from re-solidifying before it is fully captured by the solder wick. As one of skill in the art will recognize, this is a two-handed operation.

In FIG. 1, the desoldering sheath 102 replaces the solder wick. The desoldering sheath 102 has the same solder capturing properties as a solder wick. The shape of the desoldering sheath 102 is adapted to conform to the shape of the tip 104 of the desoldering gun 100. This enables the desoldering sheath 102 to envelop the tip 104 of the desoldering gun 100 in such a manner that the interior surface of the desoldering sheath 102 contacts the tip 104 substantially in its entirety. Thus, when the tip 102 is subsequently heated, there is an efficient transfer of heat energy from the tip 104 to the desoldering sheath 102. This allows the desoldering sheath 102 to heat up solid solder during a desoldering operation. The desoldering operation becomes a one-handed task; the desoldering sheath 102 both heats the solder and captures the solder after it has melted.

Figure 2:
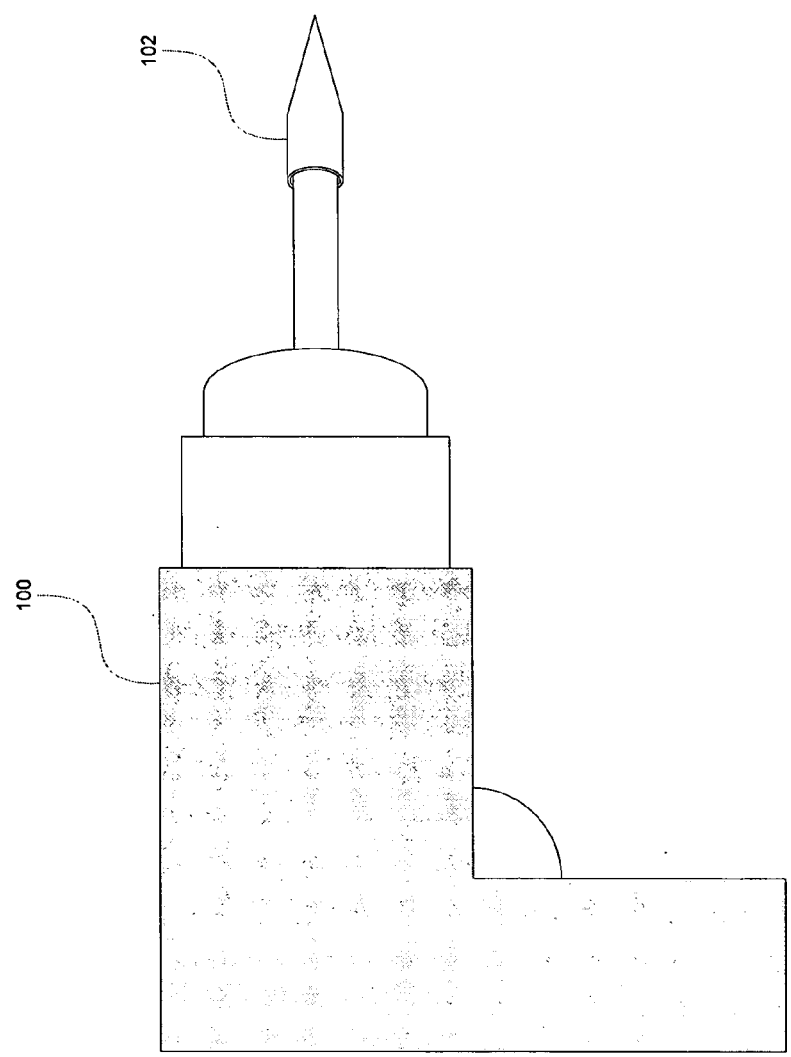
FIG. 2 depicts the desoldering sheath mounted on the desoldering gun.

FIG. 2 illustrates the desoldering sheath 102 mounted onto the tip 104 of the desoldering gun 100. As shown, since the desoldering sheath 102 is adapted to conform to the shape of the tip 104, the tip can easily heat the entire desoldering sheath 102. Furthermore, as shown, a user can hold the desoldering gun 100 and perform a one-handed desoldering operation without handling the desoldering sheath 102.

Figure 3:
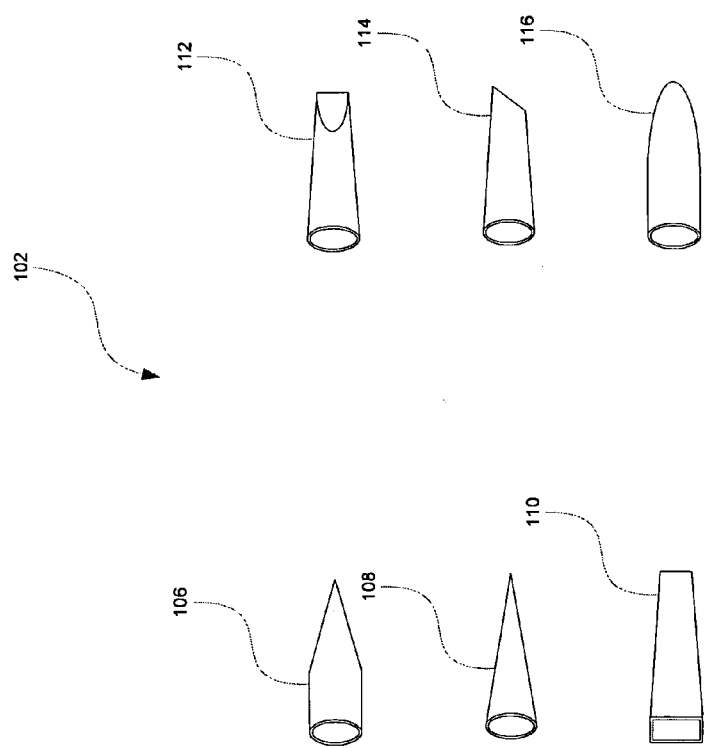
FIG. 3 illustrates various implementations of desoldering sheaths.

FIG. 3 depicts several desoldering sheaths 102 in a variety of different implementations. The different implementations shown correspond to some of the different desoldering gun tips 104 that are commercially available. In accordance with the invention, desoldering sheaths 102 can therefore be constructed to fit over any of the desoldering gun tips available on the market. For instance, the desoldering sheath 102 demonstrated in FIGS. 1 and 2 is a cone-shaped desoldering sheath 106 configured to fit cone-shaped desoldering gun tips that are common. In another implementation, an elongated cone-shaped desoldering sheath 108 can be constructed for elongated cone-shaped desoldering gun tips. In another implementation, a square-shaped desoldering sheath 110 can be made. In yet another implementation, an edge-shaped desoldering sheath 112 can be made. The edge-shaped desoldering sheath 112 is flat and tapered, similar to a flat-head screwdriver. Other implementations include an angled-edge shaped desoldering sheath 114, and a rounded cone-shaped desoldering sheath 116. It should be noted that alternative implementations of the desoldering sheaths beyond what are shown in FIG. 3 are possible; therefore the implementations shown in FIG. 3 are not meant to impose limitations on the invention.

Figure 4:
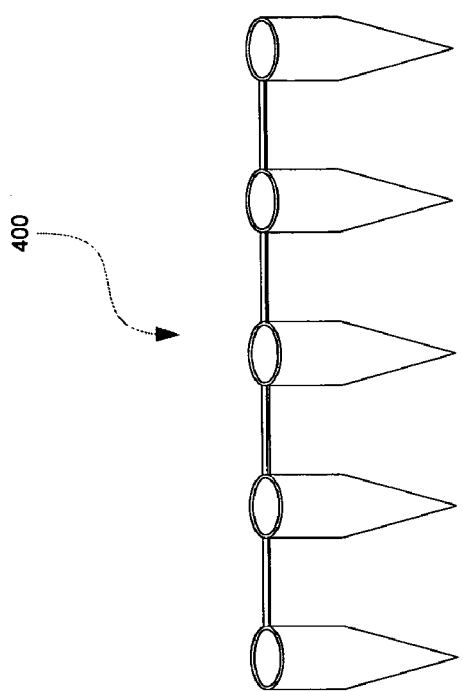
FIG. 4 illustrates a desoldering sheath array.

FIG. 4 illustrates an implementation of the invention where multiple desoldering sheaths 102 are coupled together to form a desoldering sheath array 400. The desoldering sheath array 400 provides a user with a continuous strand of desoldering material to perform desoldering operations. The user can use one desoldering sheath 102 of the array 400 until that sheath 102 is exhausted (i.e., until it can no longer collect molten solder), and the user can then quickly move on to the next sheath 102 in the array 400. This provides a level of convenience to the user.

In an implementation of the invention, the desoldering sheath 102 is constructed using hollow metal wires. The hollow interior of the metal wires provide a capillary action when placed into contact with molten solder, thereby capturing the molten solder from, for example, a printed circuit board. The hollow metal wires are generally formed using a metal such as copper. Other metals can also be used if they have the necessary heat transfer characteristics and provide the same capillary action.

FIG. 5A is a flowchart describing one implementation of a process 500 for constructing the hollow metal wires used to form the desoldering sheaths 102 of the invention. The process 500 uses fine gauge metal threads to form a metal fabric used to form the hollow wires. The metal threads generally have a fine enough gauge to allow them to be weaved into a metal fabric. For example, the metal threads used to form the metal fabric tend to have a gauge in the range of 0.01 mm to 1.0 mm. In one implementation, the metal threads used to form the metal fabric can have a gauge that ranges from 0.01 mm to 0.10 mm, for instance, a 0.05 mm gauge metal thread can be used. The metal used to form the threads can be selected from any metal known to be acceptable for desoldering operations. In one implementation of the invention, the metal used to form the metal threads is copper.

The process 500 shown in FIG. 5 begins with at least two fine gauge metal threads being twisted or braided together to form a metal rope (step 502). In one implementation, approximately five fine gauge metal threads are used to form the metal rope. Several metal ropes are generally made since they are then used to manufacture the metal fabric for the hollow metal wire.

Next, a cylindrical mold is selected for the weaving process (step 504). The metal fabric will be woven onto the cylindrical mold to form the hollow metal wire. Accordingly, the diameter of the cylindrical mold defines the diameter of the hollow metal wire. Different sized cylindrical molds may be available to enable the manufacture of hollow metal wires of differing diameters. Generally, the diameter of the cylindrical mold used will be in the range of 0.10 to 10 mm. Different configurations of desoldering sheaths 102 may require different diameters of hollow metal wires.

Next, a textile machine weaves several metal ropes into a metal fabric directly atop the cylindrical mold, thereby forming a metal fabric that wraps around the cylindrical mold (step 506). After the metal fabric has been created on the cylindrical mold, the cylindrical mold is removed (step 508) and the woven metal fabric now forms a hollow metal wire. The hollow metal wire can then be flattened (step 510) for ease of handling when storing the hollow metal wire or when manufacturing the desoldering sheaths 102.

FIGS. 5B to 5E graphically illustrate some of the steps of the process 500 for constructing a hollow wire described in FIG. 5A. FIG. 5B shows five fine gauge metal threads 512 being twisted or braided into metal rope 514. FIG. 5C shows the metal rope 514 being weaved into a metal fabric 516 around a cylindrical mold 518. FIG. 5D illustrates the woven fabric 516 after the cylindrical mold 518 has been removed, producing a hollow metal wire 520. Finally, FIG. 5E shows the hollow metal wire 520 after it has been flattened. The hollow metal wire 520 can capture molten solder using a capillary action that occurs at openings in the hollow metal wire 520. For instance, the capillary action can occur at one of the open ends of the hollow metal wire 520, and the capillary action can also occur at the many openings or pores that exist between the metal ropes 514 that are weaved together to form the hollow metal wire 520.

In implementations of the invention, the hollow metal wires 520 produced by the process 500 shown in FIG. 5A can be used to form desoldering sheaths 102. FIG. 6 illustrates one implementation of a desoldering sheath 102, referenced herein as desoldering sheath 102A, for use with the desoldering gun 100 having the cone-shaped tip 104. It should be noted that the reference numeral "102" denotes any and all implementations of desoldering sheaths disclosed herein, while specific implementations of the desoldering sheaths are denoted by "102" followed by a letter (e.g., "102A").

In the implementation of FIG. 6, the hollow metal wire 520 is wrapped around the tip 104 of the desoldering gun 100 with an open end 600 of the hollow metal wire 520 being positioned at the pointed end of the tip 104. When the tip 104 and the desoldering sheath 102A are heated and used to melt solder, the open end 600 of the hollow metal wire 520 can then capture the molten solder using capillary action. In addition, the pores in the hollow metal wire 520 can capture molten solder as well.

In one implementation, the manufacturing process for the desoldering sheath 102A shown in FIG. 6 includes coiling the hollow metal wire 520 around a cone-shaped mold 700 (shown in FIG. 7). In an implementation, the manufacturing process can further include applying an adhesive to the exterior of the hollow metal wire 520 to affix adjacent loops of the hollow wire 520 together, thereby causing the desoldering sheath 102A to retain its shape. In this implementation, the adhesive can be applied just between the adjacent loops of the hollow metal wire 520 as it is being coiled around the cone-shaped mold. Alternately, after the hollow wire 520 is coiled around a cone-shape mold, rosin can be applied to the exterior of the desoldering sheath 102A in its entirety to protect the sheath 102A and cause the sheath 102A to retain its shape.

FIG. 7 shows yet another implementation for causing the desoldering sheath 102A to hold its shape. As shown in FIG. 7, the hollow metal wire 520 is coiled around a male cone-shaped mold 700 to form the desoldering sheath 102A. The desoldering sheath 102A is then pressed into a female cone-shaped mold 702, thereby pressing the hollow wire 520 in place and using the shape-retaining properties of the metal to cause the desoldering sheath 102A to retain its form.

FIG. 8 illustrates an implementation of a desoldering sheath 102B configured for use with the desoldering gun 100 having an edge-shaped tip 800. In this implementation, the desoldering sheath 102B can be formed using a plurality of hollow metal wires 520 that are lined up parallel to each other and affixed together. The open-end 600 of each hollow metal wire 520 is placed at the end of the edge-shaped tip 800, thereby positioning the openings 600 to receive molten solder during a desoldering operation. The pores of the hollow metal wires 520 can also receive molten solder. This implementation provides multiple hollow metal wires 520 at the site of the molten solder during a desoldering operation, thus increasing the amount of solder that the desoldering sheath 102 can capture before being exhausted.

In one implementation, the hollow metal wires 520 can be fastened to the edge-shaped tip 800 with fasteners 802, which can be affixed to the hollow metal wires 520 either when the desoldering sheath 102 is constructed or after the hollow metal wires 520 are placed over the edge-shaped tip 800.

FIG. 9A is a flowchart describing one process 900 for forming the desoldering sheath 102B shown in FIG. 8. The process begins with two or more hollow metal wires 520 being oriented parallel to one another (step 802) and joined together (step 804). In one implementation of the invention, an adhesive can be used to join adjacent hollow metal wires 520 together. In another implementation, the hollow metal wires 520 can be heated along the interface where they meet causing the metal to slightly melt, thereby welding adjacent hollow metal wires 520 together. In yet another implementation, rosin can be applied to the entire structure to hold the hollow metal wires 520 together. Alternately, the fasteners 802 used to hold the desoldering sheath 102 onto the edge-shaped tip 800 can be used to hold the hollow metal wires 520 together.

Next, the joined hollow metal wires 520 are pressed into a "V" shaped mold (step 804), thereby imparting a "V" shape to the hollow metal wires 520. The "V" shape enables the desoldering sheath 102B to fit over the edge-shaped tip 800. To form the multiple openings present at the end of the edge-shaped tip 800, a cutting instrument is then used to slice the hollow metal wires 520 open at the crease in the "V" shape (step 806). This action creates two openings for each hollow metal wire 520, with the openings located where the end of the edge-shaped tip 800 will fit when the desoldering sheath 102B is in use.

FIGS. 9B through 9D graphically illustrate some of the steps of the process 900 described in FIG. 9A. FIG. 9B shows the multiple hollow metal wires 520 oriented parallel to one another and joined together. The joined hollow metal wires 520 are shown with a "V" mold having a male V-shaped mold 910 that is used to press the hollow metal wires 520 into a female V-shaped mold 912. FIG. 9B shows the joined hollow metal wires 520 in a "V" shape after being pressed into the "V" mold 912. A cutting instrument, such as a blade (not shown), is used to cut the crease in the "V" shape of the hollow metal wires 520. FIG. 9D shows the end result of the cutting operation, with newly formed openings 600 into the hollow wires formed by the blade that are used to capture molten solder. The desoldering sheath 102B is then complete and can be used on the desoldering gun 100. With this configuration when the desoldering sheath 102B is placed onto the desoldering gun 100 with the edge-shaped tip 800, the end of the edge-shaped tip 800 will be located adjacent to the openings 600. Desoldering sheaths 102 for the alternate tips shown in FIG. 3 can be formed using the same or similar processes described above.

Figure 10A:
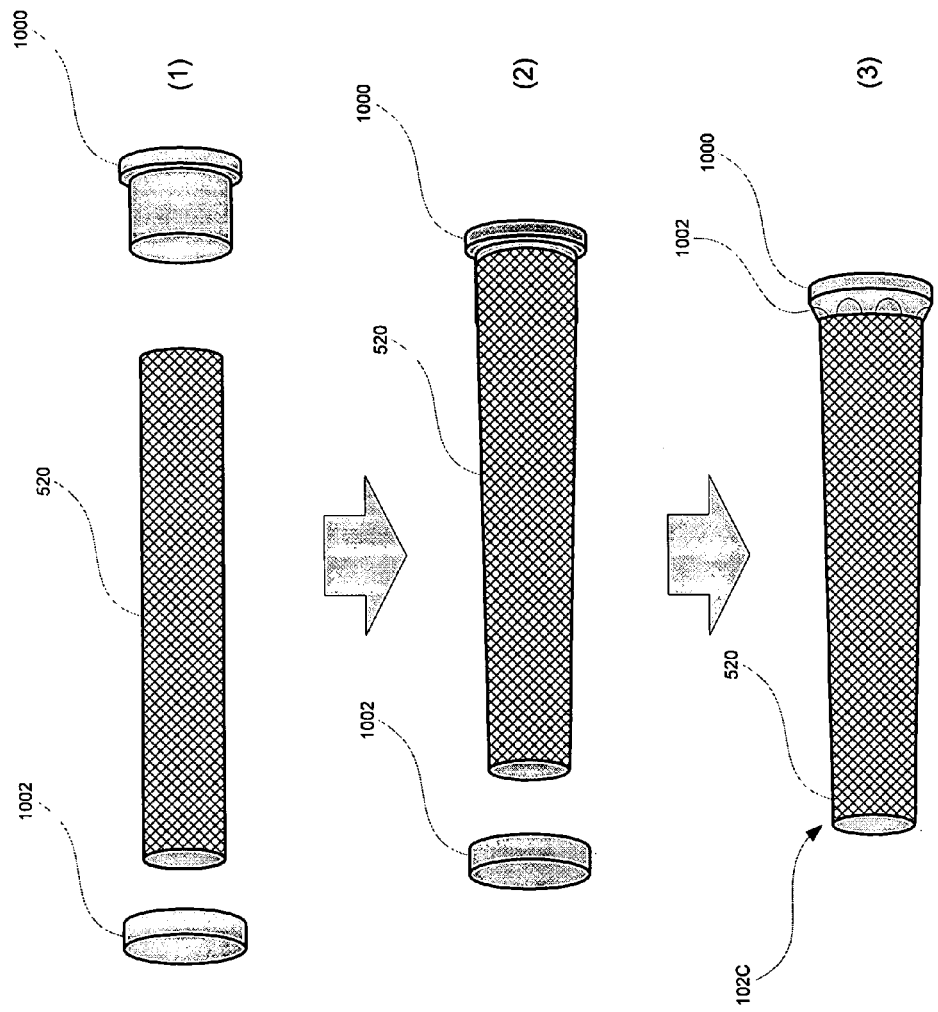
FIG. 10A illustrates a desoldering sheath coupled to a grommet.

FIG. 10A illustrates another implementation of the invention. Here, a desoldering sheath 102C is shown in which the hollow metal wire 520 is coupled to a grommet 1000. The grommet 1000 provides another method by which the desoldering sheath 102 can be mounted onto the tip 104 of the desoldering gun 100. Steps (1) to (3) of FIG. 10A illustrate the construction of the desoldering sheath 102C.

Step (1) shows three basic elements needed to build the desoldering sheath 102C, which are the hollow metal wire 520, the grommet 1000, and a grommet fastener 1002. Step (2) shows the hollow metal wire 520 mounted onto the grommet 1000. In an implementation, the diameter of the grommet 1000 is slightly greater than the diameter of the hollow metal wire 520, thereby ensuring a tight fit when the hollow metal wire 520 is mounted onto the grommet 1000. Finally, step (3) shows the grommet fastener 1002 mounted over the hollow metal wire 520 and crimped onto the grommet 1000, securely affixing the hollow metal wire 520 to the grommet 1000. Desoldering sheath 102C is now complete and can be slid onto the tip 104 of the desoldering gun 100 to perform a desoldering operation.

FIG. 10B illustrates one implementation for carrying out step (2) of FIG. 10A. In this implementation, the grommet 1000 is placed onto a cone-shaped mold 1004 as shown in step (a) of FIG. 10B. Next, the mold 1004 is inserted into the hollow metal wire 520, as shown in step (b). The increasing diameter of the cone-shaped mold 1004 tends to stretch open the hollow metal wire 520 as it meets the grommet 1000, thereby enabling the hollow metal wire 520 to fit over the grommet 1000 and be mounted, as shown in step (c).

FIG. 10C illustrates another implementation of a desoldering sheath 102. As shown in FIG. 10C, a desoldering sheath 102D can be constructed that is similar to the desoldering sheath 102C of FIG. 10A, but uses a plurality of hollow metal wires 520. In the implementation shown, three hollow metal wires 520 are mounted onto the grommet 1000 in a coaxial manner to form the desoldering sheath 102D. Beginning at step (1) of FIG. 10C, the construction of the desoldering sheath 102D starts with one hollow metal wire 520 being mounted onto the grommet 1000. Then as shown in step (2), two more hollow metal wires 520 are slipped over the first hollow metal wire 520 and mounted onto the grommet 1000 as well. The three hollow metal wires are therefore in a coaxial or concentric arrangement since they share a common axis. Finally, as shown in step (3), the grommet fastener 1002 is added and crimped onto the grommet 1000 to securely hold the three hollow metal wires 520 in place. The complete desoldering sheath 102D is then ready for use in a desoldering operation. Although desoldering sheath 102D uses three hollow metal wires 520, in other implementations of the invention any number of hollow metal wires 520 can be used.

FIG. 10D describes yet another implementation of the invention. Here, one or more tapered hollow metal wires 520 are used with the grommet 1000 to form a desoldering sheath 102E. The hollow metal wire 520 can be made into a tapered form during the metal weaving process described in FIGS. 5B to 5E. The tapered end of the hollow metal wire 520 enables the invention to be used in environments where a tapered desoldering sheath 102 is required. As shown in step (1) of FIG. 10D, a first tapered hollow metal wire 520 is mounted onto the grommet 1000. Next, as shown in step (2), two additional tapered hollow metal wires 520 are slipped over the first hollow metal wire 520 and mounted onto the grommet 1000 as well. Finally, as shown in step (3), the grommet fastener 1002 is added and crimped to secure the hollow metal wires 520 to the grommet 1000. The complete desoldering sheath 102E is now ready for use in desoldering operations, especially those operations requiring a tapered desoldering sheath 102.

In yet another implementation of the invention, the desoldering sheath 102 can be constructed using a metal fabric formed from the hollow metal wires 520 themselves. FIG. 11 illustrates a metal fabric 1100 formed using hollow metal wires 520. Similar to the process by which fine metal threads are used to form hollow metal wires 520, the hollow metal wires 520 can be weaved into a metal fabric 1100. This metal fabric 1100 can then be molded into a desired shape for the desoldering sheath 102. For instance, the cone-shaped mold 700/702 shown in FIG. 7 or the "V" shaped mold 910/912 shown in FIG. 9B can be used to mold the metal fabric 1100 into a desoldering sheath 102. Once the metal fabric 1100 has been molded, a cutting instrument can cut the tip of the metal fabric 1100 to create openings 600 in one or more of the hollow metal wires 520. These openings can then be used to capture molten solder during a desoldering operation.

FIG. 12 is a flowchart describing a process 1200 for using the desoldering sheath 102 in accordance with the invention. The process 1200 begins with a user placing the desoldering sheath 102 over the tip 104 of the desoldering gun 100 (step 1202). The user selects a desoldering sheath 102 that is configured for use with the particular tip 104 present on the desoldering gun 100. Next, the user activates or turns on the desoldering gun (step 1204). This action causes the tip 104 of the desoldering gun to heat up, which in turn causes the desoldering sheath 102 to heat up as well. The tip 104 of the desoldering gun 100, with the desoldering sheath 102 in place, is then placed in contact with the solder to be removed (step 1206). The tip 104 and desoldering sheath 102 are held against the solder until the solder melts and is drawn into the one or more openings 600 of the desoldering sheath 102 (step 1208). The solder is drawn into the desoldering sheath 102 as the solder melts. Since the desoldering sheath 102 is heated, the solder tends to stay fluid while within the hollow metal wire 520, thereby enabling the desoldering sheath 102 to capture more solder before being exhausted. Finally, when the desoldering sheath 102 is unable to draw in more solder, the desoldering sheath 102 is replaced (step 1210).

Although the invention has been described with reference to specific implementations, other implementations of the invention will be apparent to one of ordinary skill in the art. For example, the desoldering sheaths can be formed using alternate constructions for the hollow metal wires. It is, therefore, intended that the scope of the invention not be limited to the implementations described above.

The invention claimed is:

1. An apparatus for desoldering comprising:
   at least one hollow metal wire molded to conform to the tip of a desoldering tool;
   wherein the hollow metal wire is formed from a metal fabric;
   wherein the hollow metal fabric is formed from one or more metal ropes; and
   wherein the metal rope is formed by combining a plurality of metal threads comprising five metal threads.

2. The apparatus of claim 1, wherein the desoldering tool comprises a desoldering gun.

3. The apparatus of claim 1, wherein the desoldering tool comprises a desoldering iron.

4. The apparatus of claim 1, wherein the hollow metal wire is molded to conform to a cone-shaped tip of a desoldering tool.

5. The apparatus of claim 1, wherein the hollow metal wire is molded to conform to an edge-shaped tip of a desoldering tool.

6. The apparatus of claim 1, wherein the hollow metal wire is molded to conform to an elongated cone-shaped tip of a desoldering tool.

7. The apparatus of claim 1, wherein the hollow metal wire is molded to conform to a square-shaped tip of a desoldering tool.

8. The apparatus of claim 1, wherein the hollow metal wire is molded to conform to an angled-edge shaped tip of a desoldering tool.

9. The apparatus of claim 1, wherein the hollow metal wire is molded to conform to a rounded cone-shaped tip of a desoldering tool.

10. The apparatus of claim 1, wherein the metal threads have a gauge in the range of 0.01 to 0.10 mm.

* * * * *